United States Patent [19]

Sewon

[11] Patent Number: 5,112,639

[45] Date of Patent: * May 12, 1992

[54] REUSABLE BRINE FOR CONSERVING CUCUMBER

[76] Inventor: Pentti K. Sewon, Pirttilahdegatan 11, Abo SF-20320, Finland

[*] Notice: The portion of the term of this patent subsequent to Nov. 28, 2006 has been disclaimed.

[21] Appl. No.: 677,155

[22] Filed: Mar. 29, 1991

Related U.S. Application Data

[63] Continuation-in-part of Ser. No. 522,604, May 11, 1990, Pat. No. 5,039,545.

[51] Int. Cl.⁵ .................................................. A23L 3/00
[52] U.S. Cl. ....................................... 426/654; 426/267; 426/268; 426/270; 426/321; 426/335; 426/532
[58] Field of Search ............... 426/654, 267, 268, 270, 426/532, 321, 335

Primary Examiner—Donald E. Czaja
Assistant Examiner—Leslie Wong
Attorney, Agent, or Firm—Thomas R. Vigil

[57] ABSTRACT

The invention relates to a brine for conserving cucumbers in bulk which is low in sodium chloride and optionally sodium-free. The brine according to the invention is an aqueous solution containing per liter of the solution: at least 0.02 kg sodium or calcium chloride and 0.02–0.12 kg acetic or lactic acid or a non-toxic salt thereof. The taste, crispness and color of a product processed from cucumbers stored in this brine in containers equipped with stirring means for an extended period are equal to that of fresh packed cucumbers even in tropical climates and the brine can be reused after addition of make-up ingredients.

7 Claims, No Drawings

REUSABLE BRINE FOR CONSERVING CUCUMBER

This is a continuation-in-part of application U.S. Ser. No. 07/522,664 filed May 11, 1990, now U.S. Pat. No. 5,039,545.

The present invention relates to cucumber conservation and especially a reusable brine for conserving cucumbers in bulk in containers equipped with means for stirring the brine.

Cucumbers may be pickled and canned directly after harvest as so called "fresh packs" resulting in pickled cucumbers having a good taste and crispy consistency. The processing of cucumbers to produce fresh packs is also very uncomplicated including essentially only of putting sorted and picked cucumbers into cans or jars, adding the pickling solution, closing the cans or jars, and finally heat treating the closed cans or jars to pasteurize their content. The drawback of this procedure is that it requires a very big processing capacity during the relatively short harvest period.

In order to overcome this drawback and enable processing huge quantities of cucumbers during an extended period with less personnel and processing equipment, part of the harvest is conventionally fermented and stored in bulk in large silos. From these silos cucumbers are withdrawn at a desired rate for processing in a conventional manner.

Without discussing in detail different known fermentation procedures one may in general contend that the pickled cucumbers processed from such fermented bulk products, are not of the same high quality as those of fresh packed cucumbers. The controlling of the fermentation process to obtain an even quality is also difficult and the yield, taste, color and consistency of the pickled cucumbers are not so good as for fresh packs.

From the specification of U.S. Pat. No. 4,883,679 there is known a brine for conserving cucumbers in bulk making fermentation of the cucumbers unnecessary. Commercial applications of this brine have a relatively high sodium chloride content of about 0.3 kg per liter of the aqueous solution. Such a brine may after use cause serious effluent problems and necessitate expensive and painstaking desalination of huge quantities of brine. This brine sometimes produces a negative amber color in cucumbers conserved at elevated temperatures.

It is known that the sodium chloride content in brine for conserving cucumbers should be increased when the ambient temperature is increased or decreased, in the latter case to prevent the brine from freezing into ice. Thus, it was quite surprising to find that the sodium chloride content of a brine for conserving cucumbers could not only be lowered but even partly or completely replaced by less harmful calcium chloride provided its content of ingestible acids such as acetic and lactic acid was simultaneously kept at a relatively high level. It was also unexpected that the conserving effect of such a brine in every respect was improved in comparison to the brine disclosed in the specification of U.S. Pat. No. 4,883,679 although several of its ingredients, conventionally considered necessary, were deleted.

The main advantage of the present invention, however, is that it provides a brine which can be reused after addition of sodium and/or calcium chlorides and acid to compensate for chemicals absorbed by the cucumbers during conservation. Conventional brines have caused serious effluent problems due to their high chloride content, whereas the present reusable brine will not cause any waste water problems whatsoever. Thus, the brine of the present invention also helps to conserve the environment.

Another important aspect of the present invention is that it enables providing a brine which is completely sodium-free which by health authorities is considered to be an advantage in edible commodities.

The low salinity of the brine of the present invention is sufficient to conserve cucumbers even in hot climates with an average temperature of about 30° C. when the concentration of acid is kept relatively high and when the brine is stirred in conventional manner to maintain a homogeneous salt concentration throughout the brine. No negative amber color was observed even in these severe conditions.

The object of the present invention is thus to provide a reusable brine for conserving cucumbers in bulk in stirred containers which brine has a very low chloride content and which does cause less or no effluent problems at all. Another object of the present invention is to provide a brine which is sodium-free or at least exceptionally low in sodium.

The present invention also enables obtaining pickled cucumbers of substantially the same high quality as by fresh packing but with the same personnel and capital investments as with the known fermentation processes used for storing the cucumbers in bulk awaiting processing for canning.

According to the present invention, cucumbers are conserved in bulk by submerging the same in a brine containing in solution at least about 0.02 kg NaCl and/or $CaCl_2$ and 0.02–0.12 kg of an ingestible acid such as acetic acid including vinegar, or lactic acid, or a nontoxic salt thereof. When only the lower limit is given, it should be understood that the upper limit is set by the solubility of respective ingredient in the brine solution. It is, however, usually sufficient to use less than 0.15 kg sodium and/or calcium chloride and preferably not more than 0.12 kg of sodium and/or calcium chloride per liter of aqueous solution.

EXAMPLE 1

Assorted cucumbers of various size were washed shortly after harvest. The cucumbers were then stored in silos provided with stirring means for circulating the brine at least in the beginning of the conservation period as is conventional in this field, for about two months immersed in about the same volume of an aqueous brine solution representing a preferred embodiment of the invention and containing per liter of said aqueous solution: 0.12 kg NaCl, 0.04 kg acetic acid, and 3.5 g $CaCl_2$.

After this period the brine was withdrawn and topped off with NaCl, acetic acid and $CaCl_2$ for reuse. Then the stored cucumbers were put directly into cans, buckets or jars together with a spiced pickling solution containing conventional pickling ingredients such as vinegar, spices and optional sweeteners. Finally the cans, buckets or jars were closed, and hermetically sealed if required.

It was observed that bigger cucumbers could be used than in the above fermentation processes and that the cucumbers so conserved and processed were crispy and of the same high quality as those obtained by fresh packing cucumbers although the cucumbers had been stored for an extended period in a hot climate and in bulk before processing. It was also observed that satisfactory results were obtained with even as low sodium chloride contents as 0.02 kg per liter solution.

EXAMPLE 2

Seven tests were carried out according to Example 1 but without NaCl and using varying amounts of $CaCl_2$ and acetic acid. It was noted that good results were obtained with even as low quantity of $CaCl_2$ as 0.02 kg per liter solution and 0.05 kg acetic acid per liter solution, respectively kg. Even better results than with NaCl were obtained when the quantities of $CaCl_2$ were increased and improved results were obtained with up to 0.3 kg $CaCl_2$ and 0.02 kg acetic acid per liter solution.

Thus it can be noted that not only can NaCl be completely replaced by $CaCl_2$ but even better results follows from such replacement.

I claim:

1. A reusable brine for conserving cucumber in bulk in stirred containers comprising in solution per liter of the brine: at least 0.02 kg calcium chloride and 0.02–0.12 kg of an ingestible acid or a non-toxic salt thereof.

2. The brine of claim 1 wherein the ingestible acid is acetic acid.

3. The brine of claim 1 comprising not more than 0.12 kg calcium chloride per liter of aqueous solution.

4. The brine of claim 1 comprising per liter of aqueous solution:

| | |
|---|---|
| 0.02–0.3 kg | calcium chloride, and |
| 0.05–0.02 kg | acetic acid, respectively. |

5. The brine of claim 1 wherein the ingestible acid is lactic acid.

6. The brine of claim 1 wherein the ingestible acid is vinegar.

7. A reusable brine for conserving cucumber in bulk in stirred containers comprising in solution per liter of the brine: at least 0.02 kg sodium chloride and 0.02–0.12 kg of an ingestible acid or a non-toxic salt thereof.

* * * * *

UNITED STATES PATENT AND TRADEMARK OFFICE
CERTIFICATE OF CORRECTION

PATENT NO. : 5,112,639

DATED : May 12, 1992

INVENTOR(S) : Pennti K. Sewon

It is certified that error appears in the above-identified patent and that said Letters Patent is hereby corrected as shown below:

Column 1, line 6 "Serial No. 07/522,664" should be
--Serial No. 07/522,604--

Signed and Sealed this

Nineteenth Day of October, 1993

Attest:

BRUCE LEHMAN

Attesting Officer    Commissioner of Patents and Trademarks